(12) United States Patent
Chen et al.

(10) Patent No.: US 6,357,910 B1
(45) Date of Patent: Mar. 19, 2002

(54) MULTIWAVELENGTH PYROMETER FOR MEASUREMENT IN HOSTILE ENVIRONMENTS

(75) Inventors: Yaosheng Chen; Richard O. Claus; Yanjing Liu, all of Blacksburg, VA (US)

(73) Assignee: PhotoSonic, Inc., Blacksburgh, VA (US)

( * ) Notice: Subject to any disclaimer, the term of this patent is extended or adjusted under 35 U.S.C. 154(b) by 0 days.

(21) Appl. No.: 09/369,951

(22) Filed: Aug. 4, 1999

(51) Int. Cl.[7] .................................................. G01J 5/00
(52) U.S. Cl. ....................................... 374/131; 374/127
(58) Field of Search ................................. 374/127, 130, 374/131

(56) References Cited

U.S. PATENT DOCUMENTS

| | | | |
|---|---|---|---|
| 4,298,247 A | * 11/1981 | Michelet et al. | 359/291 |
| 4,850,672 A | * 7/1989 | Zimmermann | 385/111 |
| 4,955,979 A | * 9/1990 | Denayrolles et al. | 374/131 |
| 5,053,693 A | * 10/1991 | Bohnert et al. | 324/96 |
| 5,101,294 A | * 3/1992 | Jain et al. | 359/285 |
| 5,245,408 A | * 9/1993 | Cohen | 356/351 |
| 5,372,426 A | * 12/1994 | Broudy et al. | 374/127 |
| 5,471,545 A | * 11/1995 | Negami et al. | 385/1 |
| 5,815,627 A | * 9/1998 | Harrington | 385/125 |
| 5,822,222 A | * 10/1998 | Kaplinsky et al. | 702/134 |
| 6,045,626 A | * 4/2000 | Yano et al. | 148/33.4 |
| 6,094,294 A | * 7/2000 | Yokoyama et al. | 359/290 |

OTHER PUBLICATIONS

Heflin et al., "Second–order nonlinear optical thin films fabricated from ionically self–assembled monolayers", May 5, 1998, IQEC'98, pp. 36–37.*

* cited by examiner

Primary Examiner—Diego Gutierrez
Assistant Examiner—Lydia M. De Jesús
(74) Attorney, Agent, or Firm—Stevens, Davis, Miller & Mosher, LLP

(57) ABSTRACT

A pyrometer for measuring the temperature of an object with high accuracy and fast response time that uses both multi-wavelength pyrometry techniques and nanotechnology. Radiance from an object is transmitted through a fiber optic cable, is received by a thin-film multi-wavelength modulator, and is detected by an optical detector array. More specifically, the pyrometer includes means for conveying light; an optical lens; an optical fiber; means for optically modulating the wavelength of light; means for optically detecting the modulated light; means for transforming the optically detected wavelengths into electrical signals; and means for processing and recording the electrical signals. The means for optically modulating the wavelength includes at least one piezoelectric film deposited by an electrostatic self-assembly method. The pyrometer can be fabricated as either a contact-mode or non-contact mode device, both of which are suitable for use in hostile environments such as a boiler, gasifier, kiln and furnace.

16 Claims, 3 Drawing Sheets

MULTIWAVELENGTH PYROMETER FOR MEASUREMENT IN HOSTILE ENVIRONMENTS

BACKGROUND OF THE INVENTION

1. Field of the Invention

This invention relates to an apparatus for the measurement of the temperature of an object. The apparatus is particularly well suited to the measurement of the temperatures of objects in hostile environments, such as those in a gasifier, burner, boiler, kiln, furnace, or the like.

2. Description of the Related Art

Temperature measurement in a hostile environment are often difficult, and may even be impossible. In general, temperatures inside of furnaces, reactors, boilers, gasifiers, burners, kilns, incinerators, and the like are measured by thermocouples, infrared pyrometers or optical pyrometers. Unfortunately, thermocouples are very fragile in a hostile environment and thus coated with a thin layer of refractory material, consequently, the thermocouples do not sense the combustion temperature directly, but the heat transmitted from the burner chamber through the thin refractory material layer. As a result, there is an inherently large lag-time (a few minutes) for thermocouple temperature measurements to be obtained. Such delays can cause un predictable operating problems or even disasters. For example, during hasifier startup, reaction initiation must be detected immediately in order to confirm that the reaction has begun and that unreacted materials are not accumulating within the gasifier and other downstream equipment. Timed delays are clearly not acceptable in this application. In addition, slow response time (>1 minute) makes thermocouples impractical for use in the gasification monotoring systems controlled in real-time by computers. Thermocouples have proven unreliable. Moreover, the refractory layer coatings on thermocouples are often broken due to corrosion and excessive slag build-up that occurs under harsh environmental conditions.

As an alternative to thermocouples, infrared or optical pyrometers are sometimes used to monitor temperature in harsh environments. The infrared and optical pyrometer techniques involve measuring the thermal radiation emitted by the target and inferring the temperature from knowledge of the radiation law and the emitting characteristics of the surfaces being measured. Their measurement accuracy critically depends on the distance between the target and the pyrometer. However, the detector and the electronic parts of infrared (or optical) pyrometers cannot withstand high temperature (>150° F.), so the pyrometers have to be mounted external to the reactor, gasifier, burner, furnace, incinerators and the like, and aimed at the point of interest through a sight hole, inspection door or transparent window typically made of quartz. A major weakness of the infrared (or optical) pyrometer temperature monitor approach arises from the difficulty encountered when the pyrometers have to be placed a few meters away from the target, because this results in temperature measurements with very low accuracy and a high rate of errors. Moreover, since the infrared (or optical) pyrometers can only detect the average temperature over a relatively large region, it is not practical for such a pyrometer to be used in a combustion monitoring system where good spatial resolution is important.

The present invention provides a series of fiber optic sensor (FOS) based thermometers. Several distinguishing features include 1) High accuracy (<0.5° F.) and reliability, 2) fast response time (<1 ms), 3) measurement accuracy independent of the distance between the target and the detector, 4) measurement accuracy independent of the thermal radiation characteristics (emissivity) of the target materials, 5) detector heads incorporated into the temperature measuring devices, thus able to withstand high temperature and pressure, and possessing excellent corrosion-resistant properties, 6) devices that can be easily installed and operated, 7) pre-calibrated, maintenance-free devices (after which no further calibration is required), 8) devices that can determine the temperature of objects having physically small cross sections, without interference among system nozzles and among the temperature measuring devices, and 9) lifetimes estimated to be much longer than those of thermocouples.

OBJECTS OF THE PRESENT INVENTION

It is an object of this invention to provide a pyrometer for measuring the temperatures of an object in a harsh environment with more accuracy and better resolution, It is a further object of the invention to provide an improved pyrometer for use in measuring the temperature of an object.

Figure 1:
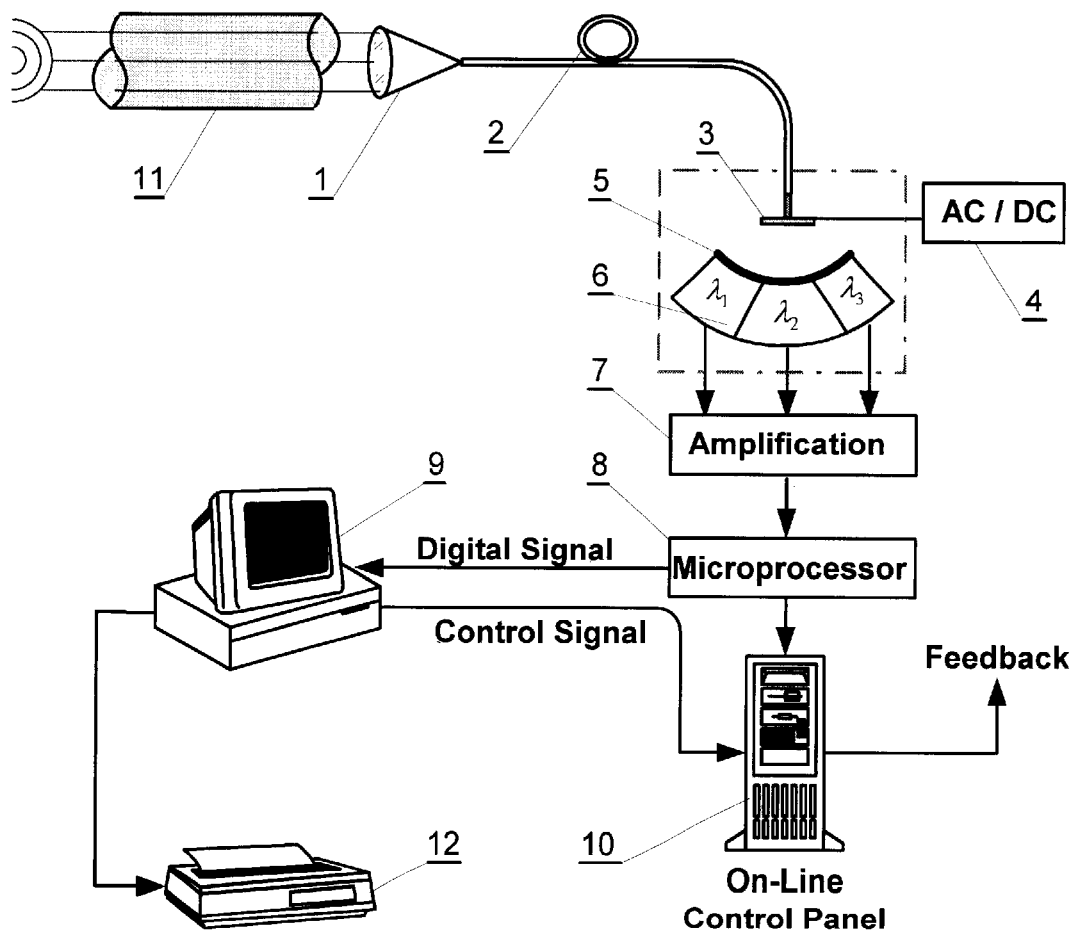
FIG. 1 illustrates a preferred embodiment of a temperature-measuring device according to the present invention.

In the drawings, the elements are identified as follows: 1 Optical lens; 2 Optical fiber cable; 3 Thin-film modulator; 4 AC/DC vibrator; 5 Filter; 6 Photoelectric detector; 7 Amplification circuit; 8 Microprocessor; 9 Master controller; 10 On-line controller; 11 light convey pipe; and 12 Printer.

DETAILED DESCRIPTION

The present invention provides a pyrometer for the measurement of temperatures in various applications, especially in hostile environments such as a gasifier, boiler, kiln, and the like. The pyrometer can be modified to include certain features, depending on the characteristics of the fuel combustion, can be economical to operate, and can have an accuracy sufficient to meet existing and changing requirements in applications such as online fuel combustion monitoring.

The pyrometers are based on fiber optic sensors. Said fiber optic sensor (FOS) pyrometers can be divided into two types: contact mode and non-contact mode. Contact mode FOS pyrometers are directly inserted into the sensing region to measure temperature, while non-contact mode FOS pyrometers determine temperature at a standoff distance from the measurement targets. Since the measurement accuracy of the series of the fiber optic sensor-based pyrometers that are the subject of the present invention is independent of the distance between the target and the detector as well as the thermal radiation of the target materials, both contact mode and non-contact mode FOS pyrometers function on the same principles and have similar structures, thus producing the same performance. The contact mode FOS pyrometers are in general used to measure temperatures of less than 2200° F. and limited by the high temperature degradation of the housing materials, while non-contact mode FOS pyrometers can work at higher temperatures and in corrosive regions. The primary difference between contact mode and non-contact mode FOS pyrometers is that the latter is more costly to produce.

FIG. 1 is a diagrammatic view of a FOS pyrometer. Numeral 1 represents an optical lens. Said optical lens can be made with sapphire, quartz, polymer or optical glass depending upon the distance between the target and the lens, and the target temperature. Optical fiber cable 2 may have a single core, a double core or multiple cores, each core having a diameter of about 100–300 $\mu$m. Several layers, i.e., a metal layer, a heat insulating layer, an oil layer, a heat dispassion layer, and a reinforcement layer are coated on the single core, double core, or multiple cores of said optical fiber 2. The output end of the optical fiber cable 2 is coated with a layer of thin film that functions as a sharp cut-off attenuator for light transmission. The cut-off wavelength depends on the temperature measurement range of the sensor. The length of the optical fiber cable can be as short as a few millimeters or as long as several thousand meters. In the case of a long optical fiber cable 2, said optical fiber cable 2 also functions as a stationary mode fiber that will pass the signals and block the noise. A piezoelectric thin-film wavelength modulator 3 is monitored by an AC/DC inverse vibrator 4, the thickness of the piezoelectric film on said piezoelectric thin-film modulator 3 is more than 40 nm. An optical filter 5 is installed in front of detector 6. The filter 5 passes only such radiation as falls within the selected spectral band. After the O/E transformation, the electrical signals are input into an amplification circuit 7 and the output from said circuit 7 is input to a microprocessor 8. The signals from said microprocessor 8 enter an on-line monitor for the on-line control and/or are further transmitted into a terminal master controller for feed-back monitoring of the entire process. The detector is mounted on the end of a light convey pipe 11. Said light convey pipe 11 may be made from high temperature stainless steel or ceramic. The detector head may be either directly inserted into the target (contact mode) or placed at a distance from the target and aimed at the target area (non-contact mode). The radiation energy from the target is received by the optical lens 1 and optical fiber cable 2, and then separated into individual wavelengths $\lambda_1, \lambda_2, \lambda_3, \ldots$ by said piezoelectric thin-film modulator 3.

If the energy $w_1$ refers to a wavelength $\lambda_1$, and the energy $w_2$ corresponds to a wavelength $\lambda_2$, the total radiation R received by the FOS pyrometer will be based on the Plank's Law:

$$R_1 = \frac{w_1}{w_2}, \quad R_2 = \frac{w_2}{w_3}, \ldots \tag{1}$$

$$\text{where} \quad w = \frac{c_1}{\lambda^5}\left[\exp\left(\frac{c_2}{\lambda T}\right) - 1\right] \cdot \varepsilon(\lambda T), \tag{2}$$

$C_1$=a constant,
$C_2$=0.014388 M K,
$\varepsilon(\lambda T)$=radiation rate,
$\lambda$=wavelength, and
T=temperature
For a gray body, $$\varepsilon(\lambda T) \approx \varepsilon(T). \tag{3}$$

Then, $$R_1 = \left(\frac{\lambda_2}{\lambda_1}\right)^5 \exp\left[\frac{c_2}{T}\left(\frac{1}{\lambda_2} - \frac{1}{\lambda_1}\right)\right] \tag{4}$$

$$R_2 = \left(\frac{\lambda_3}{\lambda_2}\right)^5 \exp\left[\frac{c_2}{T}\left(\frac{1}{\lambda_3} - \frac{1}{\lambda_2}\right)\right] \tag{5}$$

$$R_i = \left(\frac{\lambda_{i+1}}{\lambda_i}\right)^5 \exp\left[\frac{c_2}{T}\left(\frac{1}{\lambda_{i+1}} - \frac{1}{\lambda_i}\right)\right] \tag{6}$$

The output energies $w_i$ and their ratios $R_i$ can be detected by the FOS pyrometer, and its microprocessor will display the series of $R_1, R_2, R_3, \ldots$. The average R can be obtained by $$R = \frac{R_1 + R_2 + R_3 + \ldots + R_i}{i} \tag{7}$$

Thus the temperature T corresponds to the average R. In general, the accuracy of the temperature measurement can be as small as ±0.1° C., and the response time can be as fast as 1 $\mu$s when two wavelengths are compared. The accuracy of the temperature measurement can be as small as ±0.1° C. when the multiple wavelengths are separated and compared as in our present invention.

Figure 2:
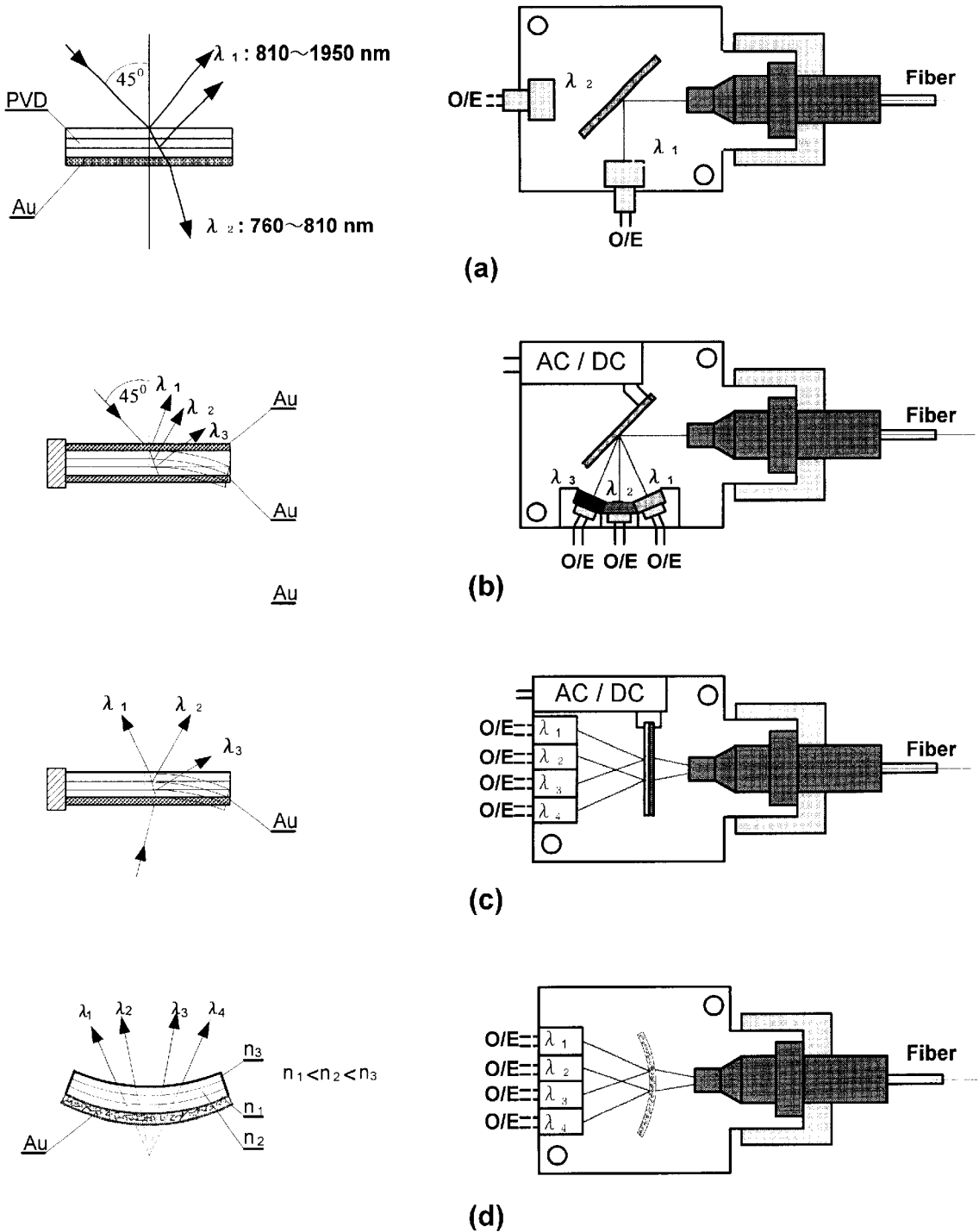
FIG. 2 is a graphical representation of the thin-film modulators used in the temperature measuring devices.

FIG. 2 illustrates the principles and the structure of the piezoelectric thin-film modulator 3. The deposition of the piezoelectric thin-film can be carried out using the electrostatic self-assembly monolayer (ESA or ESAM) method (sometimes called ionic self assembly monolayer, i.e., ISAM). The piezoelectric thin-film comprises a series of layers of films formed with a gradual increase in the index of refraction as a function of the number of the layers. The materials used for ESA films can be polymer, inorganic and organic molecules, cage-structured materials, semiconductor clusters, and noble metal or metal oxides clusters. Several distinguishing features of said ESAM piezoelectric thin-film are, 1) it is flexible and can be bent, 2) the transmission of infrared light may be more than 90%, 3) the transmission wavelengths can be continuously changed with the change of the curvature radius of the said ESAM piezoelectric thin-film, and 4) the thickness of each layer can be controlled at the Angstrom-level. FIG. 2a shows a double-wavelength splitter. The first layer on the substrate is a layer of ESA metal (for example, Au) film with the number of bilayers ranging from one-to several hundred. When the double-wavelength splitter is placed at an angle of 45° with respect to the orientation of the input light, the reflected wave has a longer wavelength than the transmitted wave. A reflection-made piezoelectric thin-film modulator is shown in FIG. 2b. Two layers of ESA metal (for example, Au) film with the number of bilayers ranging from one to several hundred are coated on both sides of the substrate, as the first layer, respectively. Then multilayer piezoelectric thin-films with a gradual increase in the index of refraction with increasing layer number are coated on the top of the metal layer that directly faces the input light. The piezoelectric thin-film is bent when the AC/DC inverse vibrator is activated, which causes the reflective wavelengths of the light to change. When detector number 1 receives infrared light wavelengths reflected by the piezoelectric thin-film with a wavelength $\lambda_1$, the other infrared light such as $\lambda_2, \lambda_3, \lambda_4, \ldots$ are not reflected but transmitted by the piezoelectric thin-film. In succession, progressive wavelengths may be detected so a continuous infrared spectrum can be obtained by a series of detectors. In order to reduce the width of the half-band of the spectrum, optical filter films can be coated on the surfaces of the detectors. Similarly, a transmission-mode piezoelectric thin-film modulator is illustrated in FIG.

2c based on the same principle but with only one metal layer coated on one side of the light splitter plate. FIG. 2d demonstrates a dispersion-mode piezoelectric thin-film modulator. The piezoelectric film arrangement is the same as that in FIG. 2b. When the substrate is bent, it functions to spatially disperse wavelengths of light similar to the dispersion effect in a prism. When the angle between the input light and the plane of the light splitter is continuously changed, the output light can be spatially separated into different wavelengths $\lambda_1, \lambda_2, \lambda_3, \lambda_4, \ldots$ and received individually by the series of photoelectric detectors. The piezoelectric thin-film modulator fabricated by the ESA method as discussed above can be used not only for the temperature measurement instrumentation, but also for other applications including the implementation of precise optical instruments and spectrometers.

Figure 3:
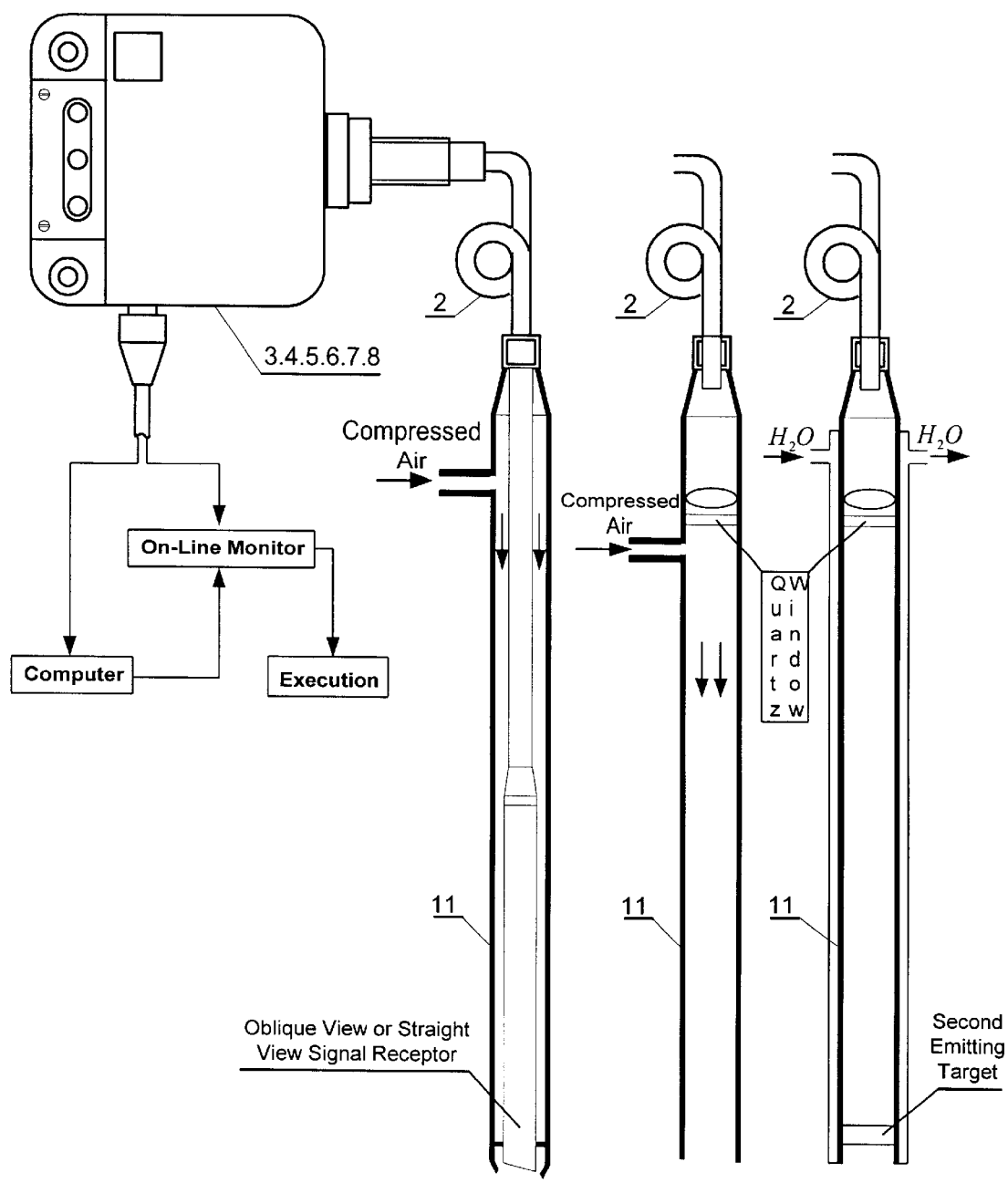
FIG. 3 shows the diagrammatic views of the temperature measuring devices.

FIG. 3 shows diagrammatic views of pyrometers with different modifications. The optical convey pipe 11 can be made of either high temperature stainless steel or ceramic. The specific shapes of the optical convey pipe 11 can be fabricated based on the requirements of practical applications. The fundamental requirements for said optical convey pipes 11 are as follows. 1) long-life, 2) easily sealed, and 3) high temperature-resistance. A quartz protection window may be installed in front of the optical lens. The pyrometers shown on the left and in the middle in FIG. 3 are used as non-contact mode pyrometers, while the pyrometer shown on the right side in FIG. 3 is employed as a contact mode pyrometer where the light convey pipe can be directly inserted into the target.

The principle of the present invention can be used to measure not only high temperature, but also low temperature in either a hostile or benign environment.

While the present invention has been described with particular reference to preferred embodiments, the protection sought is to be limited only by the terms of the claims that follow.

What is claimed is:

1. A pyrometer for measuring the temperature of an object, said pyrometer comprising:

(a) means for conveying light from said object;

(b) an optical lens for receiving said conveyed light;

(c) an optical fiber for transmitting said received light;

(d) means for optically modulating the wavelength of light transmitted by said optical fiber into at least one wavelength;

(e) means for optically detecting at least one wavelength;

(f) means for transforming said optically detected at least one wavelength into electrical signals; and (g) means for processing and recording said electrical signals, wherein the means for optically modulating comprises a substrate, a first ESA metal layer, deposited by an electrostatic self-assembly (ESA) method, on the substrate, and a piezoelectric film comprising from 10 to several hundred ESA coatings formed on the first ESA metal layer, wherein the index of refraction of the ESA coatings gradually increases, and wherein the ESA coatings are formed from materials selected from the group consisting of polymers, semiconductor clusters, cage-structured molecules, metal and metal oxide clusters.

2. The pyrometer of claim 1, wherein the optical fiber includes at least one core coated with a layer selected from the group consisting of a layer of metal, a layer of heat insulating material, a layer of oil, a layer of heat dispassion material, a layer of reinforcement, and combinations thereof.

3. The pyrometer of claim 1, wherein the optical fiber is less than 3 mm long.

4. The pyrometer of claim 1, wherein the optical fiber is more than 1000 meters long.

5. The pyrometer of claim 1, wherein the piezoelectric film further functions as a cut-off optical filter.

6. The pyrometer of claim 1, wherein the means for optically modulating further comprises a photoelectric converter O/E.

7. The pyrometer of claim 6, wherein the means for optically modulating further comprises a series of photoelectric converters O/E.

8. The pyrometer of claim 1, wherein the first ESA metal layer is gold.

9. The pyrometer of claim 8, wherein a second ESA metal layer is coated on a side opposite the first ESA metal layer.

10. The pyrometer of claim 9, wherein the second ESA metal layer is gold.

11. The pyrometer of claim 1, wherein an electrode is coated on an outermost ESA coating of the piezoelectric film, and wherein, when an AC or DC electric field is applied across the piezoelectric film, the means for optically modulating functions as a reflection-type prism spectrometer and additionally as an optical chopper and optical filter.

12. The pyrometer of claim 1, wherein an electrode is coated on an outermost ESA coating of the piezoelectric film, and wherein, when an AC or DC electric field is applied across the piezoelectric film, the means for optically modulating functions as a transmission-type prism spectrometer and additionally as an optical chopper and optical filter.

13. The pyrometer of claim 1, wherein an electrode is coated on an outermost ESA coating of the piezoelectric film, and wherein, when an AC or DC electric field is applied across the piezoelectric film, the means for optically modulating functions as a dispersion-type spectrometer and additionally as an optical filter.

14. A method of measuring the temperature of an object with the pyrometer of claim 1, said method comprising the steps of:

(a) conveying light from said object;

(b) receiving said conveyed light with said optical lens;

(c) transmitting said received light with said optical fiber;

(d) optically modulating the wavelength of light transmitted by said optical fiber into one or a plurality of wavelengths;

(e) optically detecting said one or a plurality of wavelengths;

(f) transforming said optically detected wavelengths into electrical signals; and (g) processing and recording said electrical signals.

15. The method of claim 14, said method further comprises, between said steps (c) and (d), the step of applying an electric field across said means for optically modulating the wavelength of light.

16. The method of claim 14, wherein optically modulating the wavelength includes using at least one said piezoelectric film deposited by an electrostatic self-assembly (ESA) method.

* * * * *